United States Patent
Yanai et al.

(10) Patent No.: US 10,809,148 B2
(45) Date of Patent: Oct. 20, 2020

(54) COMBINED GAS LEAKAGE DETECTION AND QUANTIFICATION

(71) Applicant: OPGAL OPTRONIC INDUSTRIES LTD., Karmiel (IL)

(72) Inventors: Omer Yanai, Karmiel (IL); Ernest Grimberg, Karmiel (IL); Gil Abramovich, Karmiel (IL); Alberto Wahnon, Karmiel (IL)

(73) Assignee: OPGAL OPTRONIC INDUSTRIES LTD., Karmiel (IL)

( * ) Notice: Subject to any disclaimer, the term of this patent is extended or adjusted under 35 U.S.C. 154(b) by 0 days.

(21) Appl. No.: 15/752,894

(22) PCT Filed: Mar. 27, 2017

(86) PCT No.: PCT/IL2017/050380
§ 371 (c)(1),
(2) Date: Feb. 15, 2018

(87) PCT Pub. No.: WO2017/168415
PCT Pub. Date: Oct. 5, 2017

(65) Prior Publication Data
US 2019/0339158 A1   Nov. 7, 2019

Related U.S. Application Data

(60) Provisional application No. 62/428,559, filed on Dec. 1, 2016.

(30) Foreign Application Priority Data

Mar. 27, 2016 (IL) .......................................... 244775

(51) Int. Cl.
*G01M 3/38* (2006.01)
*G01M 3/00* (2006.01)
*G01M 3/22* (2006.01)

(52) U.S. Cl.
CPC .............. *G01M 3/38* (2013.01); *G01M 3/002* (2013.01); *G01M 3/22* (2013.01)

(58) Field of Classification Search
CPC ........... G01M 3/38; G01M 3/002; G01M 3/22
(Continued)

(56) References Cited

U.S. PATENT DOCUMENTS 8,274,402 B1   9/2012   Moses et al.
8,386,164 B1   2/2013   Moses
(Continued)

OTHER PUBLICATIONS

Mobile Robot Navigation Using Vision and Olfaction to search for a Gas/Odor Source (Year: 2004).*
(Continued)

*Primary Examiner* — John E Breene
*Assistant Examiner* — Dacthang P Ngo
(74) *Attorney, Agent, or Firm* — Pearl Cohen Zedek Latzer Baratz LLP

(57) ABSTRACT

Gas leakage monitoring systems and methods are provided, which use infrared camera(s) configured to capture images and to detect gas leakage at specified detection locations (SDLs) captured thereby, sniffer(s) configured to quantify the gas leakage at specified measurement points, and processing unit(s) in communication with the sniffer(s) and the camera(s), which are configured to associate and display sniffer point measurements within captured image(s) or video of the corresponding SDLs. The systems and methods generate a documentation of gas leakage measurements in association with images of the sniffers' positions during the measurements, e.g., measurement data being displayed on the image(s) of the sniffer(s) and provide additional combined analysis of images and measurements.

13 Claims, 8 Drawing Sheets

(58) Field of Classification Search
 USPC .......................................................... 702/51
 See application file for complete search history.

(56) References Cited

U.S. PATENT DOCUMENTS

| | | | |
|---|---|---|---|
| 8,872,654 B2 | 10/2014 | Komninos | |
| 9,228,938 B2 | 1/2016 | Hager et al. | |
| 2004/0050188 A1* | 3/2004 | Richards | G01D 21/00 |
| | | | 73/866.3 |
| 2010/0127173 A1* | 5/2010 | Schmidt | G01M 3/38 |
| | | | 250/338.5 |
| 2010/0230593 A1* | 9/2010 | Hill, Jr. | G01M 3/38 |
| | | | 250/330 |
| 2013/0250124 A1 | 9/2013 | Furry | |
| 2019/0094101 A1* | 3/2019 | Spiegel | G01M 3/2853 |

OTHER PUBLICATIONS

Gas Leak Detection Through Infrared Camera (Year: 2008).*
International Search Report and Written opinion of PCT Application No. PCT/IL2017/050380, dated Jun. 26, 2017.

\* cited by examiner

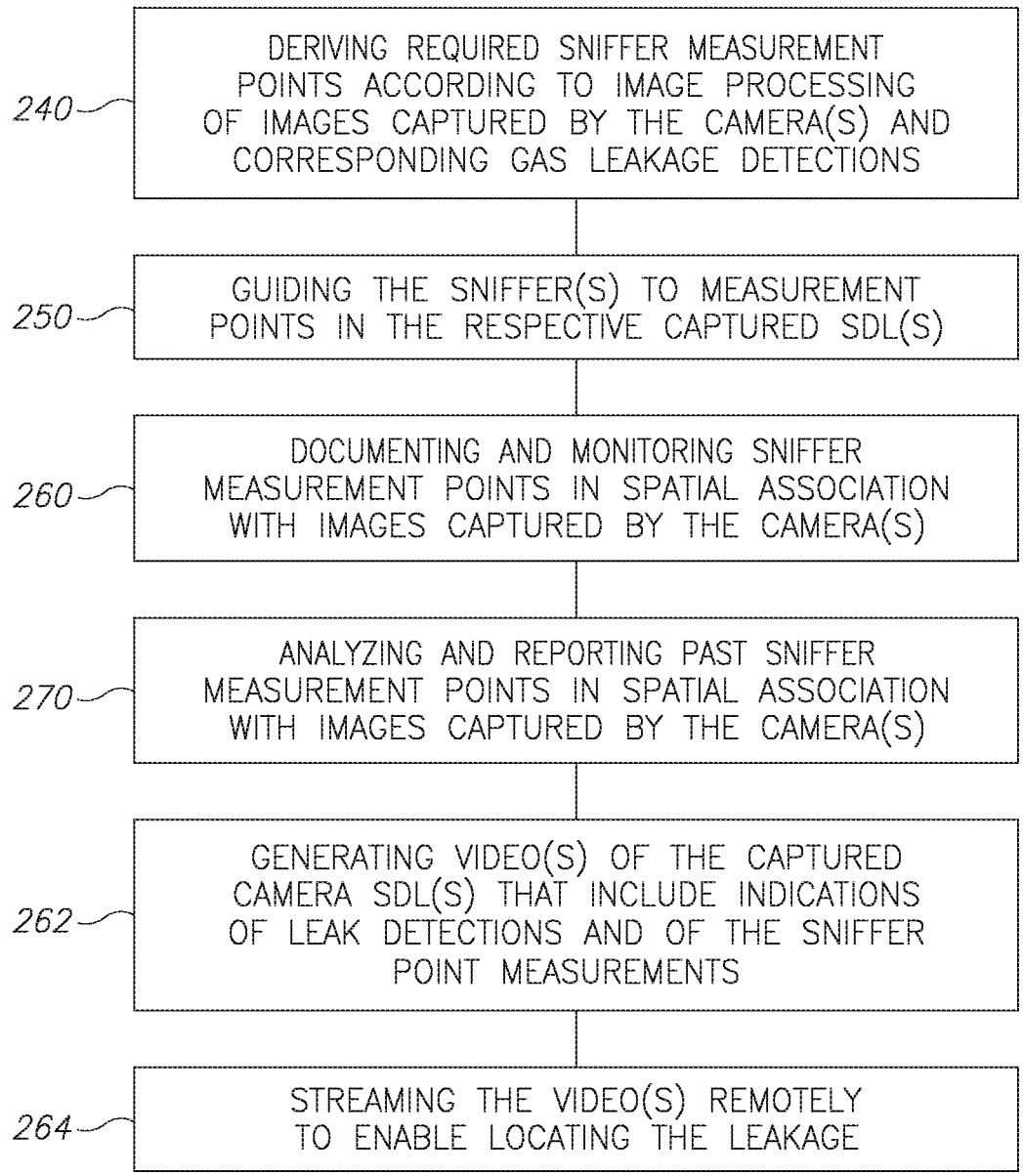
Figure 2 (cont. 1)

COMBINED GAS LEAKAGE DETECTION AND QUANTIFICATION

CROSS-REFERENCE TO RELATED APPLICATIONS

This application is a National Phase Application of PCT International Application No. PCT/IL2017/050380, International Filing Date Mar. 27, 2017, entitled: "COMBINED GAS LEAKAGE DETECTION AND QUANTIFICATION", published on Oct. 5, 2017 as International Patent Application Publication No. WO 2017/168415, this application also claims the priority of Israel Patent Application No. 244775, filed Mar. 27, 2016 and the benefit of U.S. Provisional Patent Application No. 62/428,559, filed Dec. 1, 2016, all of which are hereby incorporated by reference in their entireties.

BACKGROUND OF THE INVENTION

1. Technical Field

The present invention relates to the field of leakage detection, and more particularly, to gas leakage detection.

2. Discussion of Related Art

Gas leakage detection is a crucial process in the operation of gas storage and handling facility. U.S. Pat. No. 8,386,164 discloses the locating of LDAR (leak detection and repair) components using position coordinates which are stored and updated in a database and further discloses receiving an input pertaining to an LDAR component, obtaining position coordinates of a handheld computer device and associating the position coordinates of the handheld computer device with the LDAR component; and U.S. Pat. No. 8,274,402 discloses data collection processes for optical leak detection, including receiving information pertaining to LDAR components within a specified area, recording a video of the LDAR components for a predetermined amount of time using a camera, associating the video with the information, and storing the video along with the information to a memory located in a computer. U.S. Pat. No. 9,228,938 discloses detecting characteristics of a gas such as an exhausted plume from a vehicle or factory plant, leaked gas from an oil well or gas resource, or unidentified gas from an unknown source; by sweepingly directing a beam of light through the gas to a target surface on which the beam of light is scattered, acquiring the scattered light scattered from the target surface, and processing the acquired scattered light to determine the characteristics of the gas, where the characteristics of the gas comprise at least one of a temperature of the gas and an amount of at least one ingredient of the gas.

For many years the authorities throughout the world recognize the use of sniffers for measuring concentration of various volatile organic compounds (VOC) in parts per million (PPM) as a method for monitoring gas leaks. Furthermore, a protocol called Method 21 defined by the US environmental protection agency (EPA).

However, the impact to the environment is not only due to concentration but also due to the overall amount of molecules that were released to the atmosphere. Therefore, a better criteria is Mass Flow Rate.

As of today, the Mass Flow Rate is calculated indirectly using estimation and assumption and tables for conversion from PPM to CO2 equivalent. The prior art method is based on statistics and as such is not accurate.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a gas leakage monitoring system comprising: at least one infrared camera configured to capture images and to detect a gas leakage at specified detection locations (SDLs) captured thereby, at least one sniffer configured to quantify the gas leakage at specified measurement points to yield corresponding sniffer point measurements, and at least one processing unit in communication with the at least one sniffer and the at least one infrared camera, the at least one processing unit configured to associate the sniffer point measurements with at least one image of at least one respective SDL according to a spatial relation between the specified measurement points and the at least one SDL.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
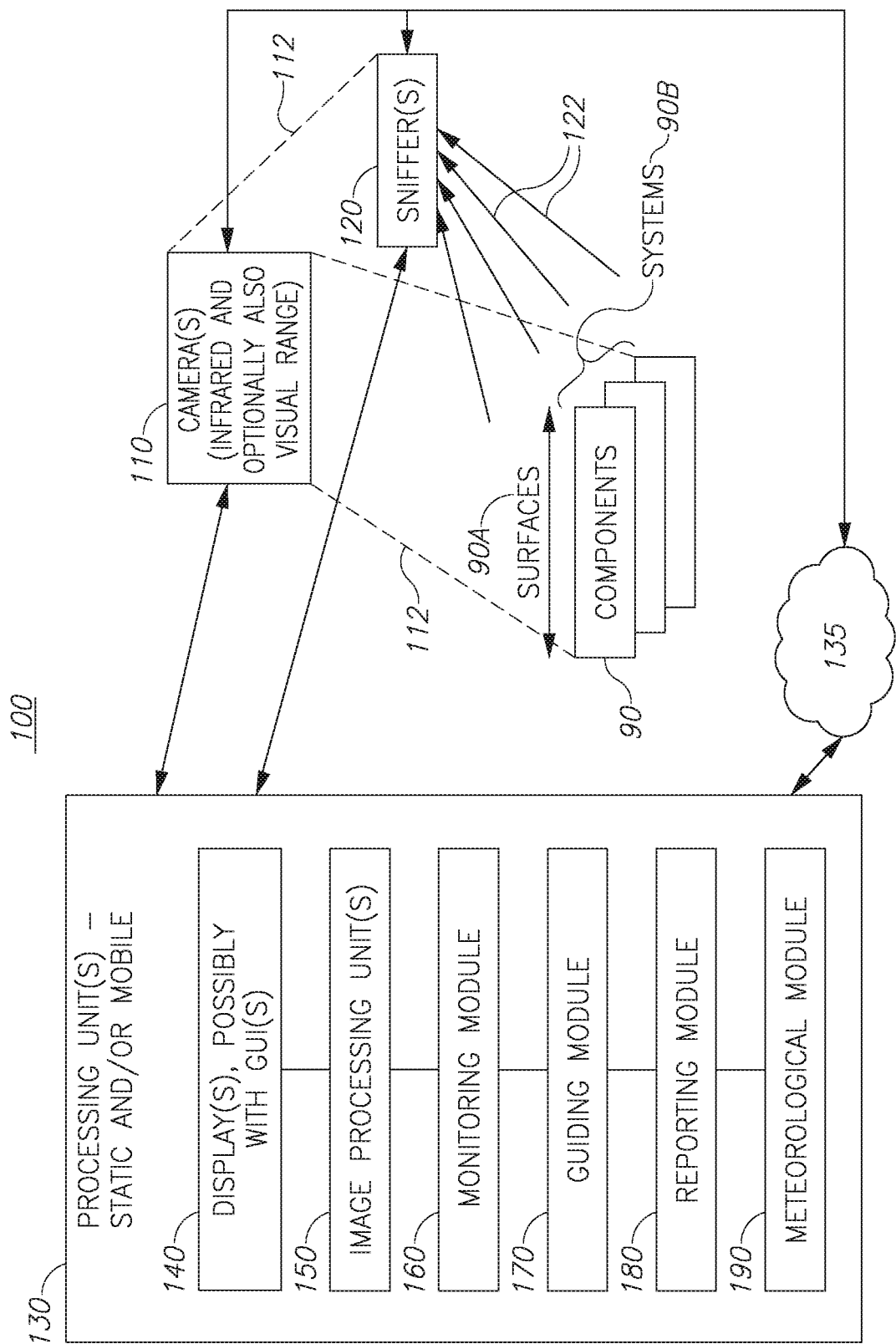
FIGS. 1A-1D are high level schematic block diagrams of a gas leakage monitoring system, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein.

Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Gas leakage monitoring systems and methods are provided, which use infrared camera(s) configured to capture images and to detect gas leakage at specified detection locations (SDLs) captured thereby, sniffer(s) configured to quantify the gas leakage at specified measurement points, and processing unit(s) in communication with the sniffer(s) and the camera(s), which are configured to associate and display sniffer point measurements within captured image(s) or video of the corresponding SDLs. The systems and methods generate a documentation of gas leakage measurements in association with images of the sniffers' positions during the measurements, e.g., measurement data being displayed on the image(s) of the sniffer(s) and provide additional combined analysis of images and measurements.

Figure 1B:
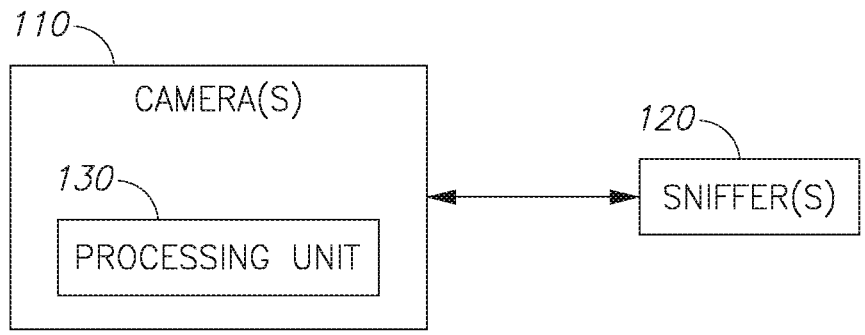
Figure 1C:
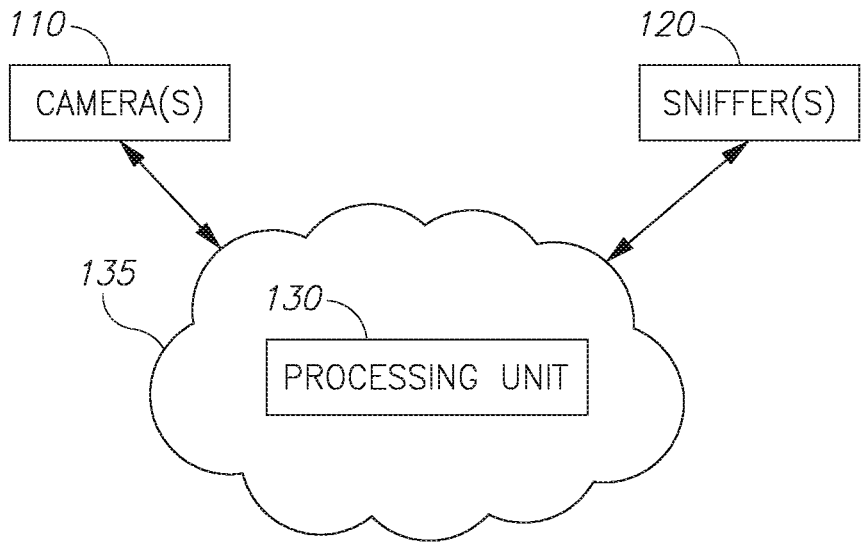

FIGS. 1A-1C are high level schematic block diagrams of a gas leakage monitoring system 100, according to some embodiments of the invention. Gas leakage monitoring system 100 may be applied to monitor any type of gas handling facility, e.g., one comprising multiple reactors and/or containers as well as an associate pipework system. Gas leakage monitoring system 100 comprises at least one infrared camera 110 configured to detect gas leakage at specified detection locations (SDLs) 112 captured thereby, i.e., by at least one infrared camera 110. SDLs 112 are indicated in FIG. 1A with respect to the camera's field of view, in a non-limiting manner. SDLs 112 may comprise predefined locations, e.g., as part of an inspection routine and/or may comprise arbitrary locations, determined according to any reason, and used for planned or random monitoring of the facility. Therefore, system 100 may use SDL images taken by camera(s) 110 to provide first detection of gas leakage. It is noted that infrared camera(s) 110 (e.g., optical gas imaging (OGI), thermal/infrared gas leakage detection (GLD)) provide visual information concerning the existence and location of a leakage, yet does not directly quantify the leakage. It is further noted that image(s) captured by the camera may well refer to video sequences comprising multiple images.

As illustrated in FIG. 1A, gas leakage monitoring system 100 also comprises at least one sniffer 120 configured to quantify gas leakage to yield corresponding sniffer point measurements at specified measurement points 122, e.g., of a component 90 such as a LDAR (leak detection and repair) component or any component in pipelines, containers etc., possibly integrated in a network such as a chemical facility. It is explicitly noted that the disclosed invention is applicable to any regulatory procedures and any kind of facility in the field of gas detection. Sniffer(s) 120 may comprise any gas leakage quantification device, applying any measurement method such as e.g., flame ionization detection (FID), photo-ionization detection (PID), toxic vapor analyzer (TVA), high flow sampler etc. Sniffer(s) 120 may perform any type of local gas leakage measurement, such as analyzing samples from specified measurement points 122, e.g., with respect to gas quantity, gas composition and/or with respect to specific gas(es) or any gases. The captured images of SDLs 112 may but must not include sniffer(s) 120 or part thereof.

Gas leakage monitoring system 100 further comprises at least one processing unit 130 in communication with at least one sniffer 120 and at least one infrared camera 110. Processing unit 130 may be implemented as a processing module in a central monitoring system or as an independent mobile unit, possibly embedded in camera unit 110. Processing unit 130 may receive measurements and images from sniffer(s) 120 and camera(s) 110, respectively and possibly control sniffer(s) 120 and camera(s) 110 with respect to the measurement points 122 and SDLs 112, respectively, as well as with respect to any operational parameter thereof. The combination of infrared imaging and associated sniffer measurements enables monitoring and detecting leakage over component surfaces 90A and across a range of components 90 and systems 90B (i.e., monitoring systems such as pipework, production units, reaction modules etc.), due to the enabled effective management of camera(s) 110 and sniffer(s) 120, as explained below.

Any of processing unit 130, camera(s) 110 and sniffer(s) 120 may be connected to a cloud resource 135 (e.g., a communication link, a remote serve, a remote database, etc.) for communicating with each other and/or with additional system elements. Processing unit(s) 130 may further utilize position information of any source (e.g., an internal or an external GPS global positioning system module, GPS modules associates with infrared camera(s) 110 and/or sniffer(s) 120, or any other positioning units) and incorporate the position data in the combination of images and measurements. Any additional data concerning camera(s) 110 and/or sniffer(s) 120 (e.g., functionality, operative status, parameters etc.) may likewise be incorporated in the combination of images and measurements. Camera(s) 110 and sniffer(s) 120 may be mobile or static. Processing unit(s) 130 is configured to associate the sniffer point measurements with at least one image of at least one respective SDL according to a spatial relation between the specified measurement points and the at least one SDL. The spatial relation may be that the measurement points are within the SDL, in close association therewith (e.g., sniffer measurements adjacent to a captured SDL) or in other spatial relations, drivable via models or approximations (e.g., the sniffer measurement points may be downwind of the SDL). Processing unit(s) 130 may be configured to display sniffer point measurements within captured camera SDLs or in association therewith, e.g., in augmented or fused images, in video sequences, as associated symbols or alerts or in any other graphical way, audio signal, vibratory signal, etc. Processing unit(s) 130 may be configured to operate in realtime. When sniffer 120 is within the field of view of camera 110, and/or when measurement points 122 are within one or more SDLs 112, sniffer measurements may be visually associated in the captured image(s) with the imaged sniffer and or the imaged measurement points. For example, processing unit(s) 130 may be configured to display sniffer point measurements in association with camera images on at least one display 140 in communication therewith, e.g., display 140 with a user interface such as a GUI (graphical user interface) configured to provide an interactive interface to the user. Camera(s) 110 may comprise a visual range camera in addition to the infrared camera, and sniffer measurements may be presented on the visual range image that corresponds to the infrared image on which leak detections are shown. For example, the GUI may be associated with respective processing unit 130 and display 140 and be configured to enable a user to guide sniffer(s) 120 to measurement points in the respective captured SDL, e.g., to locations on surfaces 90A and/or in systems 90B in which leakage is suspected based on the images or based on other data (such as flow data in systems 90B). Directing sniffer(s) 120 only to suspected points enables a significant increase in the monitoring capacity an in the sniffer's utilization efficiency. Sniffer(s) 120 may be operated automatically or manually; in the latter case directing sniffer(s) 120 only to suspected points may reduce risk to personnel and increase their monitoring efficiency.

Processing unit(s) 130 may comprise at least one mobile processing unit 130 and at least one static processing unit 130 with associated displays 140. For example, mobile processing unit(s) 130 may comprise multiple PDA (personal data assistant devices), and/or tablet computers, smartphones etc., which are associated with sniffers 120; and/or multiple processors associated e.g., with cameras 110 and one or more central static processing unit 130 in communication with mobile processing unit(s) 130 and providing central analysis and control functionalities.

System 100 and/or processing unit(s) 130 may further comprise at least one image processing unit 150 configured to derive required sniffer measurement points according to image processing of images captured by camera(s) 110 and corresponding gas leakage detections. Image processing unit 150 may be configured to analyze image data, e.g., with respect to sniffers' movements and measurement points, and interpolate and/or extrapolate measurement data by sniffer(s) 120 to enhance the spatial characterization of leakages. For example, image processing unit 150 may be configured to derive 3D images or data from 2D captured images, using as additional information multiple images and/or structural information concerning the monitored facility. Processing unit(s) 130 may be configured to fuse images from one or more moving camera(s) 110, to generate and/or display a comprehensive cloud of sniffer measurements at many measurement points. Processing unit(s) 130 may further be configured to use the measurements to validate and/or enhance a model of the leakage expansion, e.g., a model of the plume formed due to the leakage. Processing unit(s) 130 may further comprise or be connected to a meteorological module 190 configured to provide meteorological data concerning the leakage region, and be configured to use the meteorological data to enhance the estimation of the plume and guide additional sniffer measurements and camera SDLs accordingly. Meteorological module 190 may be configured to provide meteorological data at a region of a detected leakage and processing unit 130 may be further configured to provide quantitative leakage plume data derived from the sniffer point measurements and the captured images. For example, system 100 may comprise static camera 110 repeatedly capturing a leakage zone and many sniffers 120 being directed by system 100 to map the plume within the leakage zone. Processing unit 130 may be configured to present on display 140 the analyzed plume, with quantitative assessments of gas concentration at different regions of the plume (e.g., possibly color-coded according to density). Thereby, system 100 may provide a quantitative enhancement of qualitative images captured by camera(s) 110.

System 100 and/or processing unit(s) 130 may comprise at least one guiding module 170 configured to suggest sniffer measurement points 122 according to SDLs 112 captured by camera(s) 110, image processing data concerning the captured SDLs and auxiliary data. For example, after scanning of the facility by camera(s) 110 and initial detection of leakage, one or more sniffers 120 may be assigned to measure leakage at one or more measurement points in a suspected region, e.g., being continuously captured in one or more SDL 112 by camera(s) 110.

For example, processing unit(s) 130 may be configured to detect a highest sniffer point measurement and to control infrared camera(s) 110 to capture at least one image of the respective measurement point.

Figure 1D:
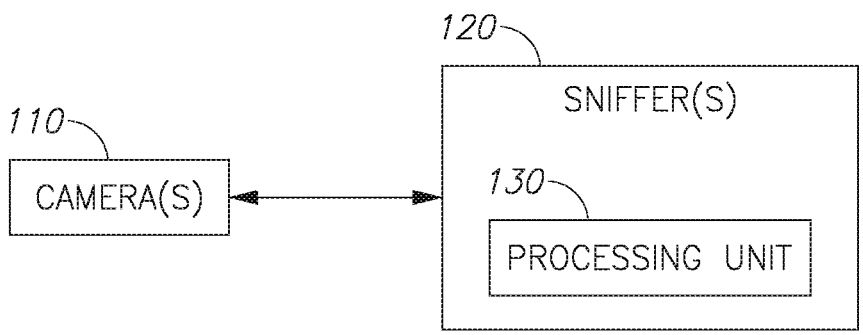

Measurement data may be associated with the captured images, e.g., as metadata, image-embedded data and/or at a corresponding database. For example, measurement data may be associated with the corresponding sniffer 120 which tool the measurement, e.g., on an image thereof by a respective camera 110. Measurement data and associated imaging (image, video, either in the visible range and/or in the infrared range, audio, etc.) may be tagged and stored in a database, local and/or cloud-based (see cloud 135). Location measurements (e.g., by GPS) may augment any of the respective data. Camera(s) 110 and sniffer(s) 120 may be permanently or temporally associated with each other, e.g., paired. Pairing between camera(s) 110 and sniffer(s) 120 may be managed by processing unit 130. Data transmission may be wired and/or wireless (e.g., over a communication link such as cloud 135 and/or an internal communication network). As illustrated in FIGS. 1B-1D, processing unit 130 or parts thereof may be part of camera unit 120, sniffer unit 110 and/or may be run on cloud 135. For example (FIG. 1B), processing unit 130 or parts thereof may be embedded in camera unit 110 and system 100 may be operated by two users one operating sniffer 120 and another operating camera 110, the latter receiving sniffer measurements from the former which are directly displayed, by processing unit 130 on camera images, and used to guide the sniffer user concerning additional measurements. In another example (FIG. 1C), processing unit 130 or parts thereof may be embedded in cloud service 135 and be configured to provide captured images with sensor measurements according to inputs communicated thereto from camera 110 and sniffer 120. In yet another example (FIG. 1D), processing unit 130 or parts thereof may be embedded in sniffer unit 120 and be configured to receive images captured by camera 110 and incorporate sniffer measurement into the captured images. In FIGS. 1B-1D, system 100 may comprise only two physical elements (camera 110 and sniffer 120) to implement the disclosed capacities. System 100 may be configured to provide captured images with incorporated sniffer measurements in realtime.

System 100 and/or processing unit(s) 130 may comprise at least one monitoring module 160 configured to document and monitor sniffer measurement points in spatial association with images captured by camera(s) 110. For example, monitoring module 160 may be configured to continuously monitor a specified section or the whole of a facility, possibly relating to multiple systems 90B and with respect to multiple surfaces 90A. In case of a detected leakage, monitoring module 160 may be configured to verify and monitor the respective area during and/or after a repair of the leakage, e.g., using one or more camera 110 and respective one or more sniffer 120. Similar documentation of repair monitoring may be saved as described above with respect to the measurement data. In a non-limiting example, processing unit(s) 130 may be configured to generate video(s) of the captured camera SDL(s) that include indications of leak detections and of the sniffer point measurements. The video(s) may be streamed to monitoring module 160 and/or to a dedicated monitoring device, and/or to a PDA or tablet with display 140 on which remote visualization is provided to enable a remote technician to locate e.g., the highest concentration, based on the image.

System 100 and/or processing unit(s) 130 may comprise at least one reporting module 180 configured to analyze and report past sniffer measurement points in spatial association with images captured by camera(s). A full documentation of leakage monitoring, repair and repair verification may be provided in case needed, e.g., to optimize the operation of system 100, improve management of camera(s) 110 and sniffer(s) 120, further research concerning the operation of the monitored facility and for regulatory purposes. Reporting module 180 may be configured to provide reports based on visual range images of region(s) of detected leakage(s) captured by camera(s) 110 which correspond to the captured infrared images, and show the leaking components. Reporting module 190 may be configured to carry out the reporting using the visual range image(s) and/or videos. Reports may be used to verify the handling of the leakage and to guide sniffer(s) 120 to verify that the leakage has been correctly mended.

For example, one operator may operate camera 110 to detect gas and another operator may operate sniffer 120 to measure specific points for gas leakage according to camera detection. Any one of the operators may have a PDA to interface respective camera 110 and/or sniffer 120 and to communicate with central processing unit 130. In another example, a single operator may operate both camera 110 and sniffer 120, e.g., by positioning camera 110 at a specified location with to have required SDL 112 and operating sniffer 120 within SDL 112 to measure specific measurement points 122 according to camera detections and indications. In either case, recording the ongoing measurements by sniffer 120 may comprise associating the sniffer's measurement results and measurement points at least partially directly in the images captured by camera 110. Camera(s) 110 and sniffer(s) 120 may be fully operational as stand-alone elements and as part of system 100, and may include various communication modules, such as various wireless or wired communication (e.g., Bluetooth, WiFi, internet access, etc.) The PDA may comprise e.g., a tablet computer, a smartphone or any other device with processing and communication abilities. System may be configured to store images and measurements, share them, derive reports and analyze the results. GPS (global positioning system) modules may be incorporated in camera(s) 110 and/or sniffer(s) 120 and be configured to provide location data regarding SDLs 112 and measurement points 122.

Figure 2:
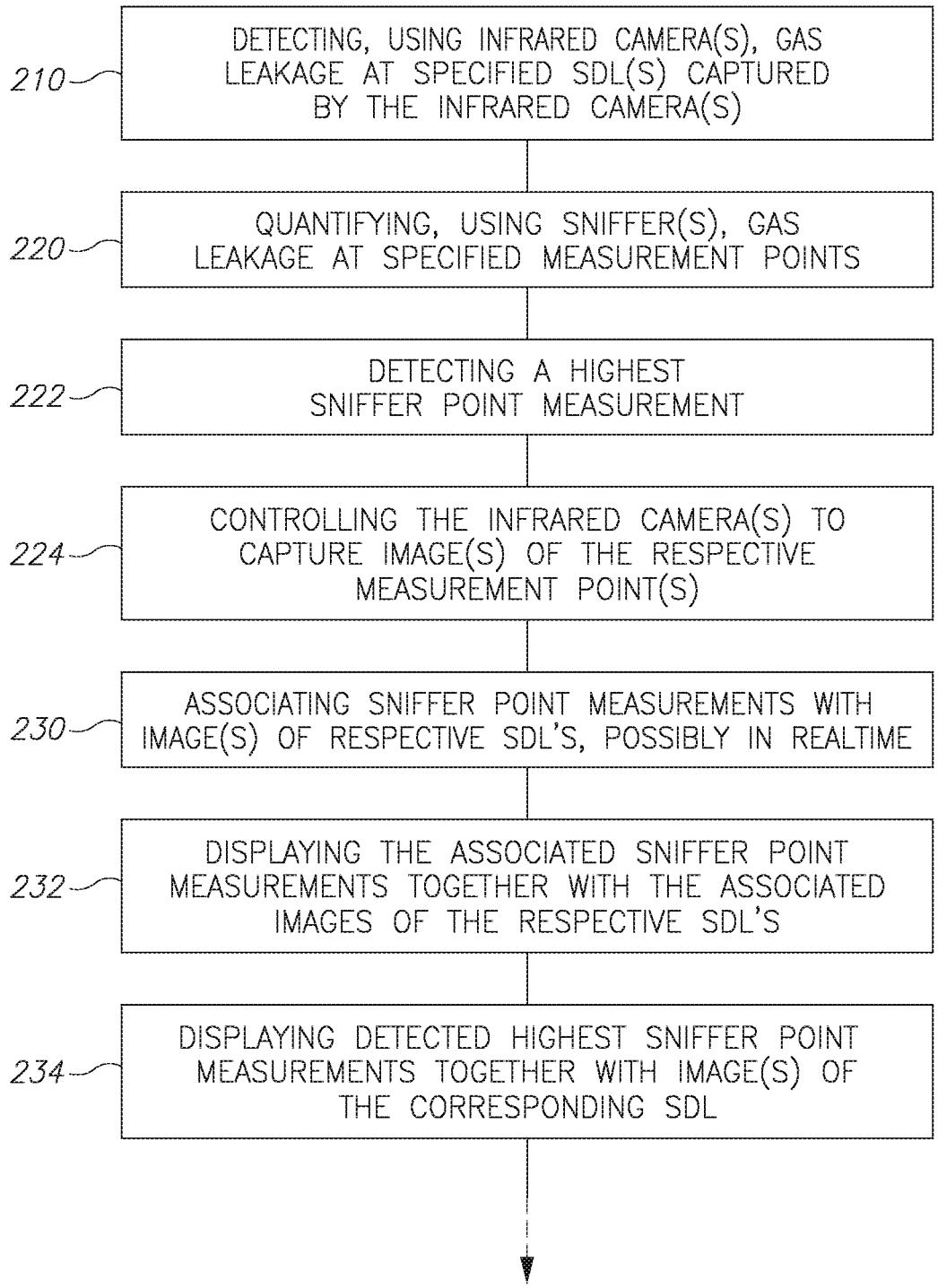
FIG. 2 is a high-level flowchart illustrating a method, according to some embodiments of the invention.

FIG. 2 is a high-level flowchart illustrating a method 200, according to some embodiments of the invention. Method 200 may comprise detecting, using at least one infrared camera, gas leakage at specified detection locations (SDLs) captured by the at least one infrared camera (stage 210), quantifying, using at least one sniffer, gas leakage at specified measurement points (stage 220), associating sniffer point measurements with image(s) of respective SDLs, possibly in realtime (stage 230), and possibly displaying the associated sniffer point measurements together with the associated images of the respective SDL's.

Method 200 may further comprise detecting a highest sniffer point measurement (stage 222) and controlling the at least one infrared camera to capture at least one image of the respective measurement point (stage 224) and/or displaying the detected highest sniffer point measurements together with image(s) of the corresponding SDL(s) (stage 234).

Method 200 may further comprise deriving required sniffer measurement points according to image processing of images captured by the camera(s) and corresponding gas leakage detections (stage 240). Method 200 may further comprise guiding the sniffer(s) to measurement points in the respective captured SDL(s) (stage 250). The derived sniffer measurement points may comprise points in which leakage is suspected according to the camera images and guiding the sniffer to these points may increase the efficiency of the monitoring.

Method 200 may further comprise documenting and monitoring sniffer measurement points in spatial association with images captured by the camera(s) (stage 260). Method 200 may further comprise generating one or more videos of the captured camera SDL(s) that include indications of leak detections and of the sniffer point measurements (stage 262) and possibly streaming the video(s) remotely to enable locating the leakage (stage 264), e.g., by a monitoring technician and/or by an automated unit.

Method 200 may further comprise analyzing and reporting past sniffer measurement points in spatial association with images captured by the camera(s) (stage 270). These method stages are described in more detail with respect to system 100 described above and optionally configured to implement method 200.

With respect to prior art, as described in U.S. Pat. Nos. 8,386,164 and 8,274,402, the present disclosure integrates sniffer gas leakage measurements into images captured by gas detection infrared cameras and provide an extended monitoring and analysis system that is based on this data integration and provides extensive and trackable guidance to and documentation of gas leakage detection operations over the whole facility.

Advantageously, system 100 and method 200 also provide substantial regulatory benefits, as all monitoring and repair processes may be documented in a retrievable fashion. In particular, detailed measurements may be integrated seamlessly in visual documentation of the facility and the measurement process itself (sniffers 120 being imaged by cameras 110 during the measurements). Current gas leakage inspection elements may be integrated into system 100 and/or operated according to method 200 and all data may be stored locally and/or remotely.

Yet another embodiment of the present invention suggests to improve a method of using a thermal camera in order to get a visual data of where is the best location to carry out the measuring of the gas leak via a sniffer. The camera in aforementioned method is used as means for detecting the source of the leak and for positioning the sniffer towards the source and for documenting the measurement process. This sequence of steps can be described as: detection, guidance, and recording.

Embodiments of the present invention suggest a direct measurement of the size of the leak (in absolute terms) by generating a 3D model of the plume of gas to which samples of the concentration are incorporated and then integrated on the volume to yield a better estimation of the amount of molecules of gas in the plume. This method eliminates the use of statistics and tables and offers a more accurate and less time consuming method for direct measurement of amount of gas.

Yet another embodiment combines imaging and a physical measurement unit. The physical measurement unit (sniffer) can be configured to positioning of the imaging device for associating spatial location and concentration measurement so as to generate the spatial 3D model. The use of accelerometers on the sniffer can also provide kinematic data for positioning of the imaging device. The imaging can also get positioning data from sonar/radar or structured light.

Embodiments of the present invention are advantageous as they add cloud mapping and calculating of the total amount of gas molecules in the cloud.

Applicant has further improved the design and propose the following concept which provide the generation of 3D gas plume reconstruction using the OGI camera.

Using image-guided gas sensing measurement locations by the sniffer(s), a 3D gas isoconcentration map is generated. This map can be presented back on the camera display, where each guided location also received visualization representation of the concentration (e.g., a dot at a certain color).

Both the original sensing guidance and the measurement display are presented on the live image as augmented reality feedback to the operator. The data is also stored for optional offline analysis.

Figure 3:
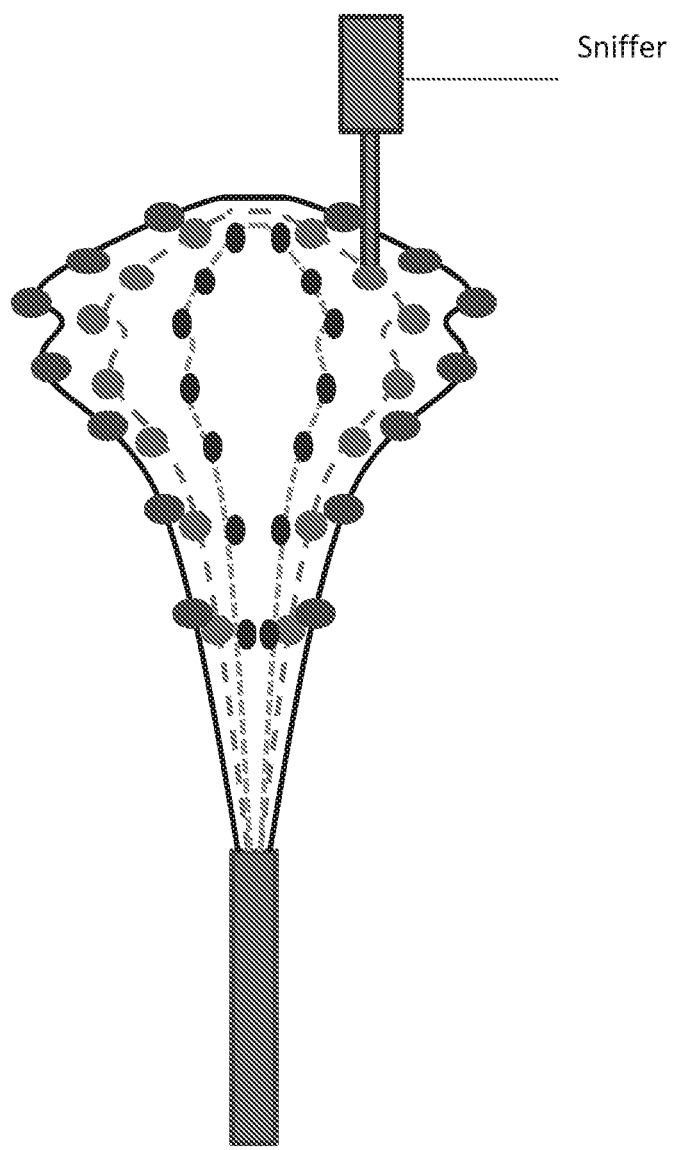
FIG. 3 is a diagram showing a plume, illustrating an aspect according to some embodiments of the invention.

FIG. 3 is a diagram illustrating, for ease of presentation, at steady state, and without wind, the plume is approximately symmetric (regardless of the small scale time-dependent motion and concentration changed inside the plume). A lateral (X-Y) distribution at a certain standoff distance Z of concentrations the values is presented. Each dot signifies a gas concentration measurement location as seen in the field of view of the camera. Each location is in fact multiple locations along the field of view.

The measurement of standoff location (from sniffer to camera) is enabled by a measurement device, such as, but not limited to laser measurement gauge.

Thus, a 3D gas concentration map is generated.

It is noted that the camera contrast is not only a function concentration but is related to the gas to ambient temperature difference, gas absorption, density and path via the following formula:

$$f(\text{delta}T)*\exp(-(\text{Absorption [cm}^2/\text{molecules]}*\text{Density [molecules/cm}^3]*\text{Path [cm]}))$$

Therefore, there is NO one-to-one monotonous function linking between the measured concentration and the image contrast location (in that case, a single isoconcentration line would have coincided with a single contrast level, which is not correct. Also, a single pixel is a narrow pyramid in 3D with varying gas concentration along it.

Figure 4:
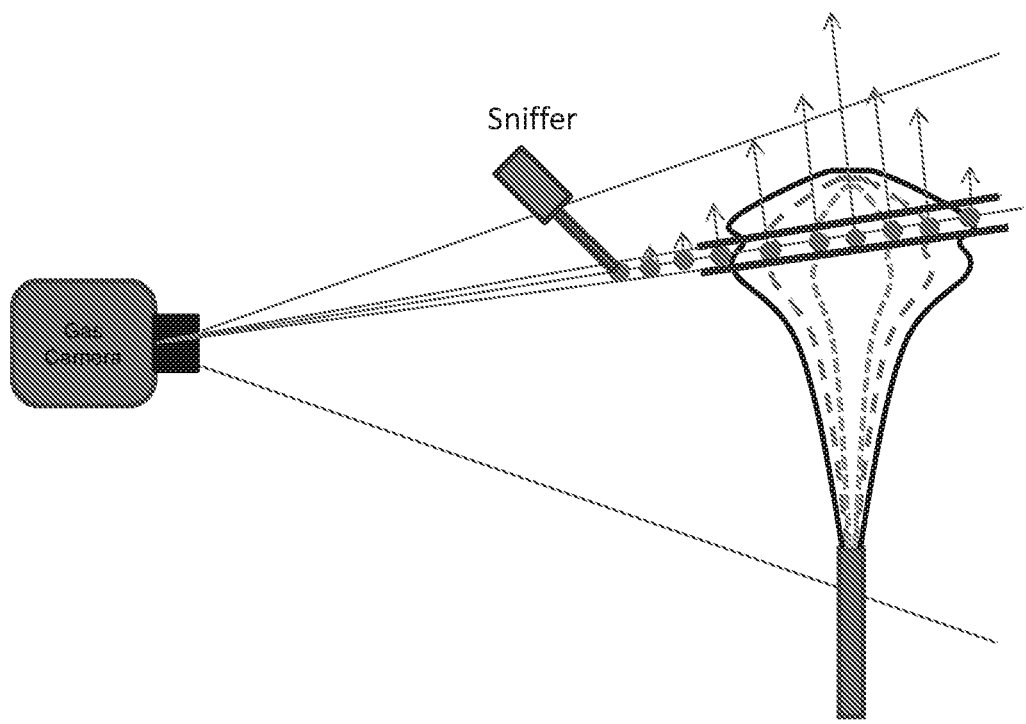
FIG. 4 is a diagram showing a plume, illustrating an aspect according to some embodiments of the invention.

FIG. 4 illustrates measurements are taken along the single pixel field of view (IFOV) around the target leak point. Once the concentration drops below a certain value representing visualization limit. Each dot signifies a gas concentration measurement location as seen in the field of view of the same pixel. The pixel volume is virtually clipped at a value representing visualization limit (where the OGI operator can no longer see gas) an assumed detection limit of the OGI camera (in orange). The arrows represent the local concentration values.

The leak standoff location is where concentration peaks. Concentration points corresponding to this standoff distance which represent an isoconcentration value of a certain low threshold (e.g., 2%) will represent the plume contour as seen from at the camera display. In FIG. 3, the brown dots would lie on an isoconcentration curve representing the plume contour. This can be presented on the display as an augmented reality.

Different isoconcentration values and plume contours will be generated for different wind speeds.

This way, plume shape and volume, and contour as viewed from the camera and its concentration distribution are generated and depicted graphically.

Figure 5:
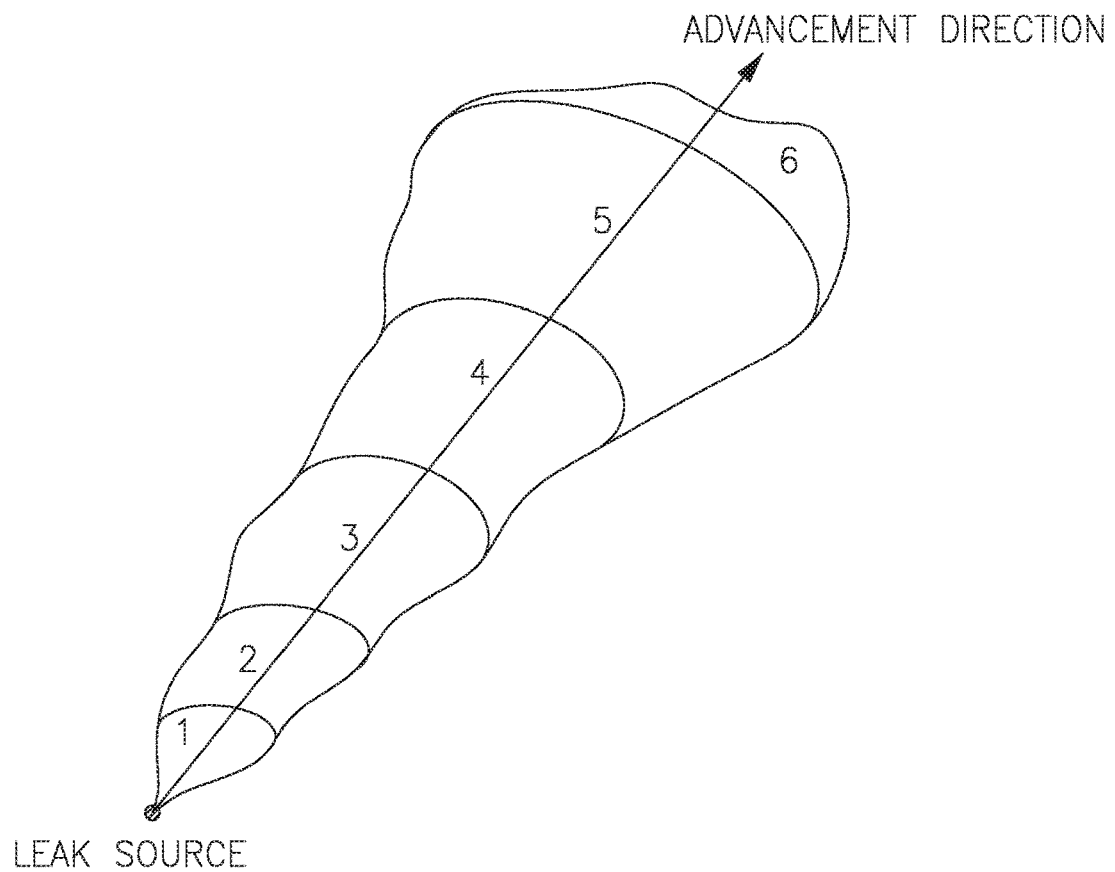
FIG. 5 show two schematic diagrams illustrating an aspect according to some embodiments of the invention.
Figure 5:
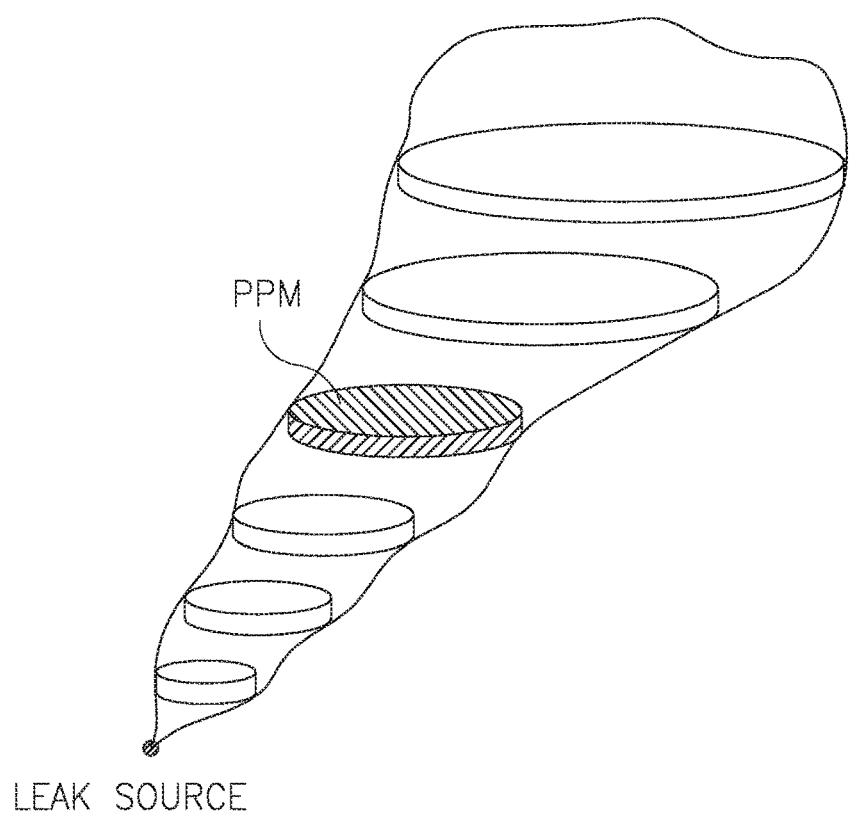

FIG. 5 shows two diagrams of a gas cloud with the upper showing advancement direction and the bottom showing how "slicing" the gas cloud assist in calculating the amount of gas in it. The gas camera is two-dimensional in nature and it is suggested to use appropriate projections in order to shift to 3D.

In order to quantify the amount of gas it is suggested to relate to the gas cloud as set of "shells" with decreasing concentrations as we go away from the source of the leak (shown in FIG. 3). Thus the calculation of the total amount of gas will be achieved by integrating (on the volume) the sampled concentration as obtained by the sniffer.

According to one embodiment, spatial guidance of the user holding the sniffer is achieved by presenting video captured by the camera on a display located on the probe of the sniffer. Thus streaming in real time from the camera to the sniffer so that the user will know where to put the probe.

Figure 6:
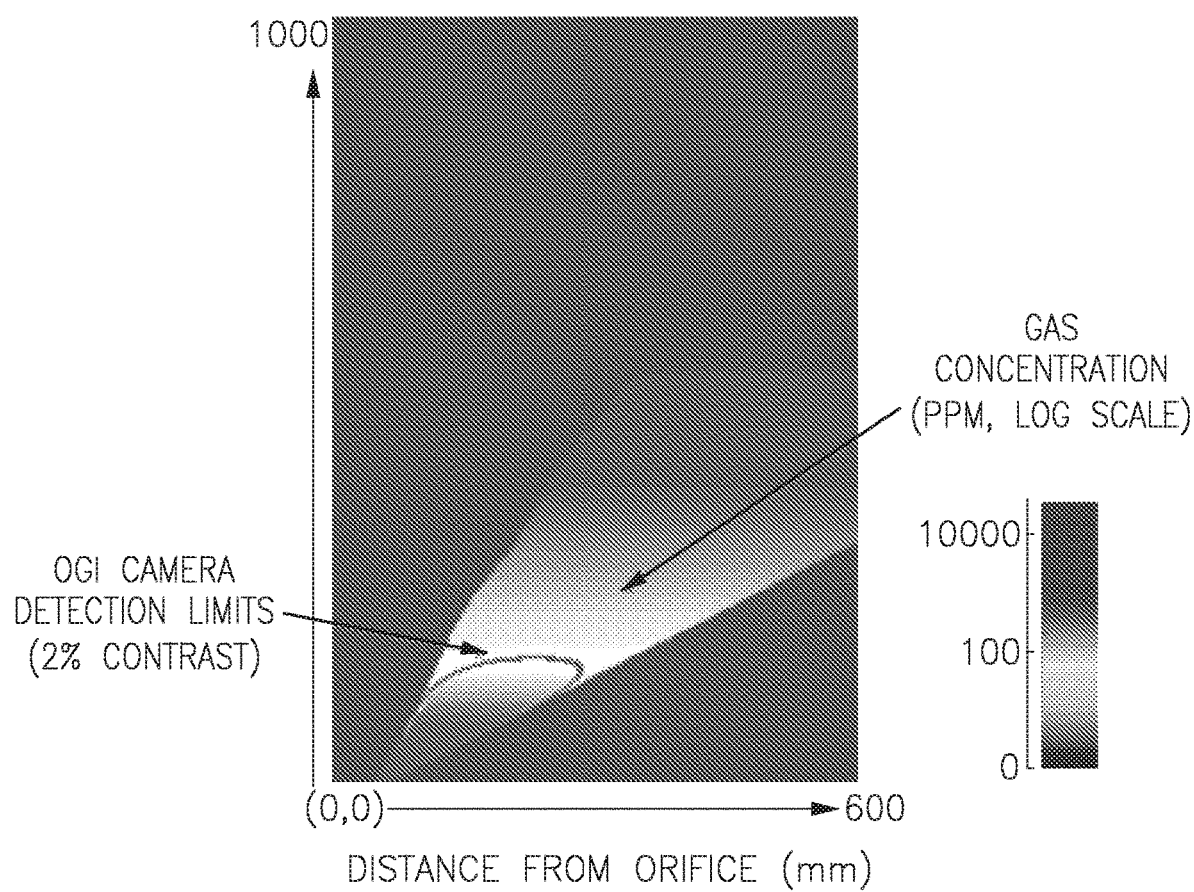
FIG. 6 is a MATLAB diagram illustrating an aspect according to some embodiments of the invention.

FIG. 6 is a MATLAB simulation illustrating PPM concentration values changing in space as can be measured via a sniffer versus the more limited detection envelope of an OGI. This illustrates the benefits from creating a 3D model of the gas cloud so all portions of the gas cloud will be included in the calculation of the total amount.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A gas leakage monitoring system comprising:
   at least one infrared camera configured to capture images and to detect a gas leakage at specified detection locations (SDLs) captured thereby,
   at least one sniffer configured to quantify the gas leakage at specified measurement points to yield corresponding sniffer point measurements, and
   at least one processing unit in communication with the at least one sniffer and the at least one infrared camera, the at least one processing unit configured to associate the sniffer point measurements with at least one image of at least one respective SDL according to a spatial relation between the specified measurement points and the at least one SDL,
   wherein the at least one processing unit is further configured to detect a sniffer point measurement higher than a predefined threshold and control the at least one infrared camera to capture at least one image of the respective measurement point.

2. The gas leakage monitoring system of claim 1, further comprising at least one display in communication with the at least one processing unit, wherein the at least one processing unit is further configured to display the associated sniffer point measurements together with the at least one image on the at least one display.

3. The gas leakage monitoring system of claim 2, further comprising at least one graphical user interface (GUI) associated with respective processing unit and display.

4. The gas leakage monitoring system of claim 3, wherein the at least one GUI is configured to enable a user to guide the at least one sniffer to measurement points in the respective captured SDL.

5. The gas leakage monitoring system of claim 1, wherein the communication of the at least one processing unit with at least one of: the at least one sniffer and the at least one infrared camera is wireless.

6. A method comprising:
   detecting, using at least one infrared camera, gas leakage at specified detection location (SDLs) which are captured by the at least one infrared camera;
   quantifying the gas leakage at specified measurement points using at least one sniffer, to yield corresponding sniffer point measurements;
   associating the sniffer point measurements with at least one image of at least one respective SDL according to a spatial relation between the specified measurement points and the at least one SDL; and
   detecting a sniffer point measurement higher than a predefined threshold, controlling the at least one infrared camera to capture at least one image of the respective measurement point and associating the highest sniffer point measurement therewith.

7. The method of claim 6, further comprising displaying the associated sniffer point measurements together with the at least one image.

8. The method of claim 6, further comprising deriving required sniffer measurement points according to image processing of images captured by the at least one camera and corresponding gas leakage detections.

9. The method of claim 6, further comprising guiding the at least one sniffer to measurement points in the at least one image of the respective SDL.

10. The method of claim 6, carried out in real-time.

11. The method of claim 6, further comprising documenting and monitoring sniffer measurement points in spatial association with images captured by the at least one camera.

12. The method of claim 11, further comprising generating a video of the captured camera SDL(s) that includes indications of leak detections and of the sniffer point measurements.

13. The method of claim 6, further comprising analyzing and reporting past sniffer measurement points in spatial association with images captured by the at least one camera.

* * * * *